United States Patent
Ikehashi et al.

(10) Patent No.: US 7,177,134 B2
(45) Date of Patent: Feb. 13, 2007

(54) VARIABLE-CAPACITANCE ELEMENT, VARIABLE-CAPACITANCE DEVICE, AND PORTABLE PHONE INCLUDING VARIABLE-CAPACITANCE DEVICE

(75) Inventors: Tamio Ikehashi, Kanagawa (JP); Tatsuya Ohguro, Kanagawa (JP); Mie Matsuo, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/137,794

(22) Filed: May 26, 2005

(65) Prior Publication Data
US 2006/0209491 A1 Sep. 21, 2006

(30) Foreign Application Priority Data
Mar. 18, 2005 (JP) .............................. 2005-078518

(51) Int. Cl.
*H01G 5/01* (2006.01)
*H01G 4/005* (2006.01)
(52) U.S. Cl. ....................................... 361/278; 361/303
(58) Field of Classification Search ........ 361/277–281, 361/303–305
See application file for complete search history.

(56) References Cited
U.S. PATENT DOCUMENTS
6,713,695 B2    3/2004  Kawai et al.
6,746,891 B2 *  6/2004  Cunningham et al. ........ 438/52
6,917,086 B2 *  7/2005  Cunningham et al. ...... 257/415
2004/0147237 A1* 7/2004  Eckl et al. ............... 455/150.1

OTHER PUBLICATIONS

X. Rottenberg et al., "Novel RF-MEMS capacitve switching structures", European Microwave Conference, Sep. 24-26, 2002.

* cited by examiner

Primary Examiner—Eric W. Thomas
(74) Attorney, Agent, or Firm—Banner & Witcoff, Ltd.

(57) ABSTRACT

A variable-capacitance element includes: a first electrode and a second electrode which are fixed on a substrate with a spacing; a movable electrode; an actuator which is supported on a supporting portion provided on the substrate to drive the movable electrode. The movable electrode is put in an electrically connecting state with the second electrode, when the movable electrode is driven to a first position by the actuator, and the movable electrode is put in an electrically non-connected state with the second electrode, when the movable electrode is driven to a second position by the actuator. The movable electrode is constituted to be always put in an electrically non-connected state with the first electrode.

20 Claims, 19 Drawing Sheets

SECTION A-A

SECTION A-A

SECTION B-B

SECTION A-A

SECTION B-B

SECTION A-A

SECTION B-B

SECTION A-A

SECTION A-A

SECTION B-B

SECTION A-A

SECTION B-B

SECTION A-A

SECTION B-B

US 7,177,134 B2

VARIABLE-CAPACITANCE ELEMENT, VARIABLE-CAPACITANCE DEVICE, AND PORTABLE PHONE INCLUDING VARIABLE-CAPACITANCE DEVICE

CROSS-REFERENCE TO RELATED APPLICATION

This application is based upon and claims the benefit of priority from prior Japanese Patent Application No. 2005-78518 filed on Mar. 18, 2005 in Japan, the entire contents of which are incorporated herein by reference.

BACKGROUND OF THE INVENTION

1. Field of the Invention

The present invention relates to a variable-capacitance element, a variable-capacitance device, and a portable phone including a variable-capacitance device.

2. Related Art

A digital variable-capacitance element manufactured using a micro-machine or MEMS (Micro-Electro-Mechanical Systems) has such merits that a variable range is wide, reduced strain is provided, Q value is large (loss resistance is small), as compared with a variable-capacitance element including a PIN diode. Therefore, the digital variable-capacitance element is suitable for use in a matching circuit for a small-sized wide range antenna in a portable apparatus.

It is known to constitute a digital variable-capacitance device with a wide variable range by using a digital variable-capacitance element (see U.S. Pat. No. 6,593,672, for example). The digital variable-capacitance device is constituted such that n ($\geq 1$) variable-capacitance elements are connected in parallel and the i (i=1, 2, . . . , n)th variable-capacitance element takes only binary of 0 [pF] or $2^i C$ [pF]. Therefore, a variable-capacitance device can be obtained that is provided with a variable range of 0[pF] to $(2^{n+1}-2) C$ [pF] and a step size of a capacitance C [pF] as a whole by controlling the variable-capacitance elements connected in parallel in a binary manner.

In the digital variable-capacitance element, a variable capacitance having binary of 0 [pF] and $2^i C$ [pH] (i=1, 2, . . . , n) by changing a distance between electrodes using an actuator is produced. As the actuator, there are ones of a static type, a thermal type, a electromagnetic type, a piezoelectric type, and so on. In such a digital variable-capacitance element, there are two factors important for improving performance as follows:

1) A resistance is small (Q value is large)
2) A capacitance ratio is large

Here, the term "capacitance ratio" means a ratio Cmax/Cmin of a capacitance value obtained when a distance between electrodes is the minimum (hereinafter, "Cmax) to a capacitance value obtained when the distance between electrodes is the maximum (hereinafter, "Cmin"). When the distance between electrodes is made sufficiently large, the capacitance value Cmin can be caused to approach to 0 [pF], but the distance between electrodes is at most about several micron meters in an ordinary digital variable-capacitance element manufactured using the MEMS technology. Consequently, a capacitance ratio of several tens can be only achieved in a conventional digital variable-capacitance element. When the capacitance ratio is small, there occurs such a problem that, when digital capacitance elements are arranged in parallel, as described in U.S. Pat. No. 6,593,672, a variable width can not be increased due to contribution of the Cmin.

SUMMARY OF THE INVENTION

A variable-capacitance element according to a first aspect of the present invention includes: a first electrode and a second electrode which are fixed on a substrate with a spacing; a movable electrode; an actuator which is supported on a supporting portion provided on the substrate to drive the movable electrode, wherein the movable electrode is put in an electrically connecting state with the second electrode, when the movable electrode is driven to a first position by the actuator, and the movable electrode is put in an electrically non-connected state with the second electrode, when the movable electrode is driven to a second position by the actuator, and the movable electrode is constituted to be always put in an electrically non-connected state with the first electrode.

A variable-capacitance device according to a second aspect of the present invention includes: a plurality of variable-capacitance elements above-described which are connected in parallel.

A portable phone according to a third aspect of the present invention includes: a matching circuit having the variable-capacitance device.

BRIEF DISCRIPTION OF THE DRAWINGS

DETAILED DESCRIPTION OF THE INVENTION

Embodiments of the present invention will be explained below with reference to the drawings.

(First Embodiment)

Figure 1:
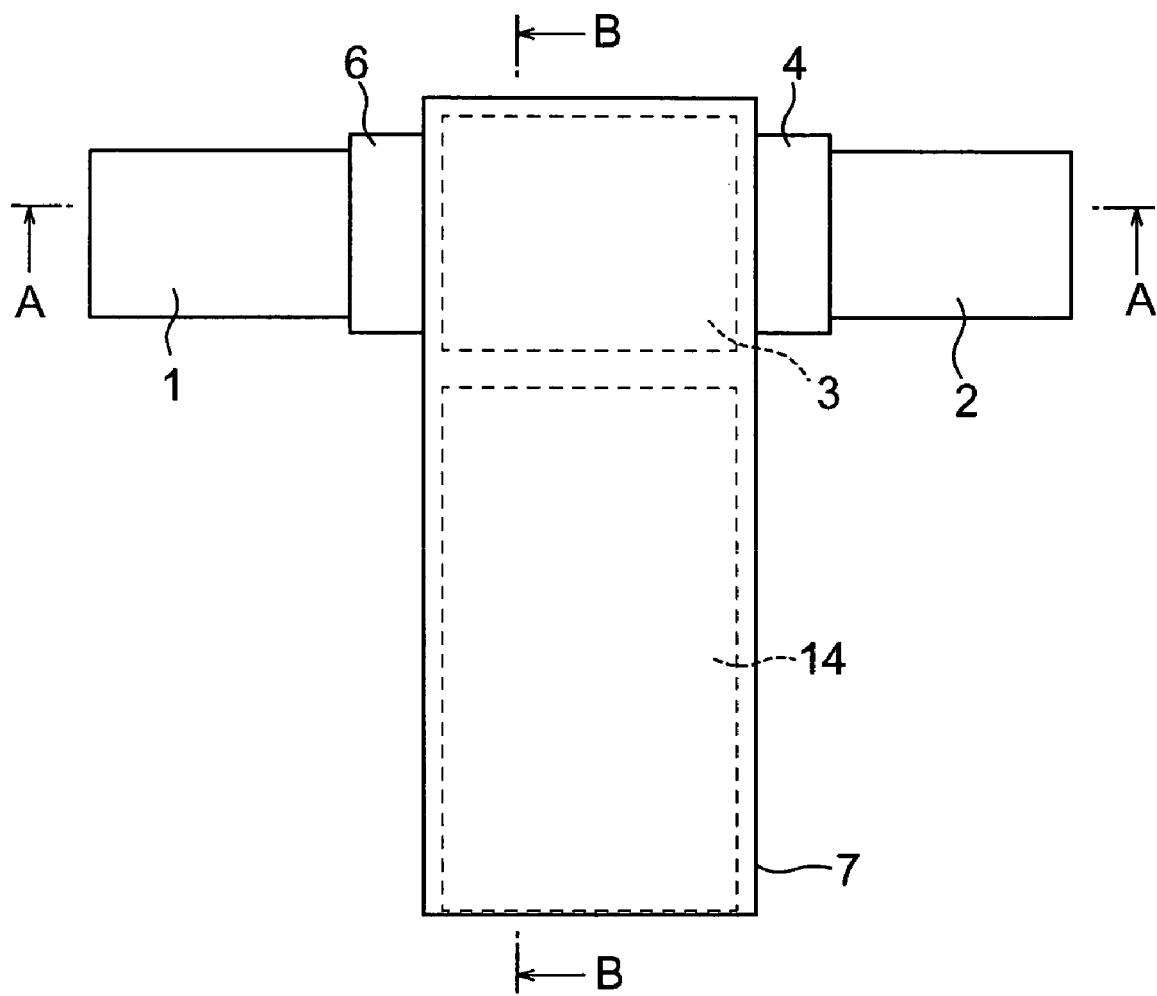
FIG. 1 is an upper view of a variable-capacitance element according to a first embodiment of the present invention.
Figure 2:
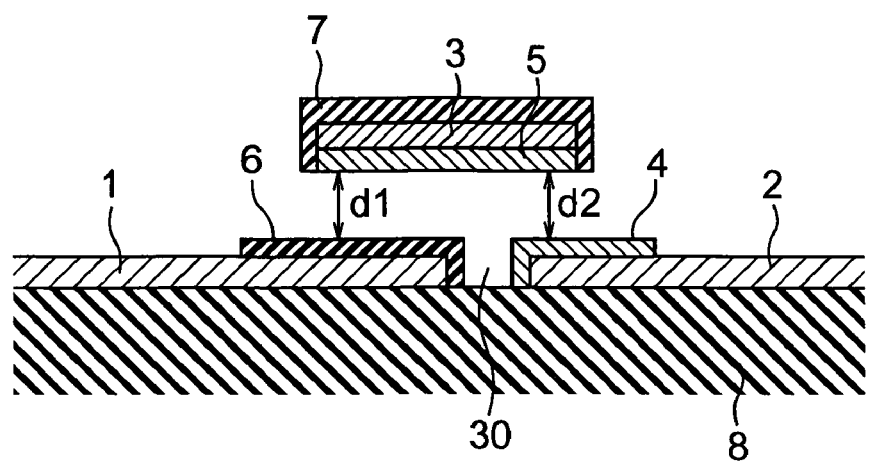
FIG. 2 is a sectional view of the variable-capacitance element according to the first embodiment, taken along line A—A shown in FIG. 1.
Figure 3:
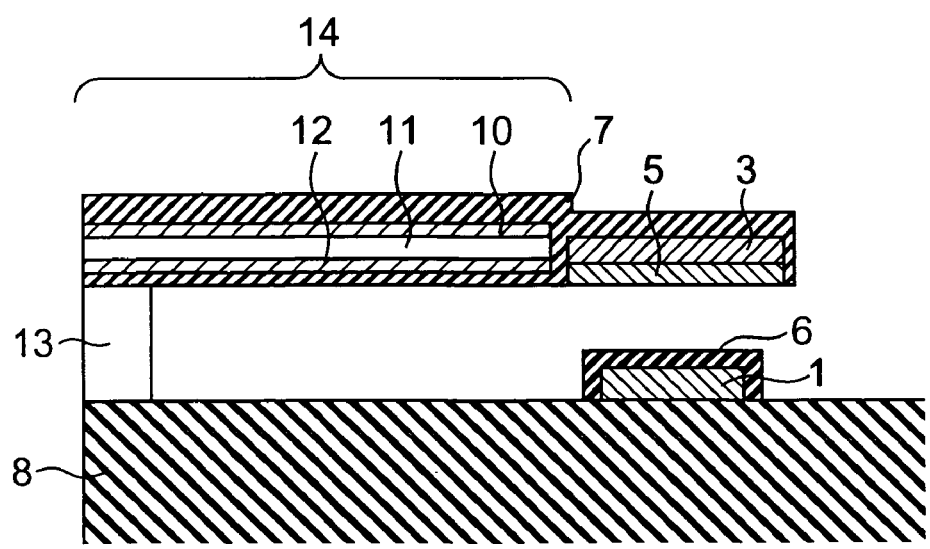
FIG. 3 is a sectional view of the variable-capacitance element according to the first embodiment, taken along line B—B shown in FIG. 1.

A variable-capacitance element according to first embodiment of the present invention will be explained with reference to FIGS. 1 to 4. FIG. 1 is an upper view of a variable-capacitance element according to the embodiment, FIG. 2 is a sectional view of the variable-capacitance element, taken along line A—A shown in FIG. 1, and FIG. 3 is a sectional view of the variable-capacitance element, taken along line B—B shown in FIG. 1.

A variable-capacitance element according to the embodiment is provided with a first and second electrodes 1 and 2 whose ends are respectively disposed on a substrate 8 through a predetermined spacing 30. An insulating film 6 is provided on a surface region of the first electrode 1 including the end opposed from the substrate 8, and a contact electrode 4 is provided on a surface region of the second electrode 2 including the end opposed from the substrate 8. A stacked body constituted of a contact electrode 5 and a floating electrode 3 is provided above the spacing 30 between the first and second electrodes 1 and 2 so as to overlap with at least portions of the contact electrode 4 and the insulating film 6 as viewed from the above. The floating electrode 3 is provided on a far side from the substrate 8, while the contact electrode 5 is provided on a near side to the substrate 8. The stacked body constituted of the contact electrode 5 and the floating electrode 3 is driven by a piezoelectric type actuator 14 provided on the substrate 8 via a supporting portion 13. The piezoelectric type actuator 14 is constituted of a stacked body including a piezoelectric film 11, an upper electrode 10 provided on an upper face of the piezoelectric film 11, and a lower electrode 12 provided on a lower face of the piezoelectric film 11. The piezoelectric type actuator 14 has insulating films 7 provided on upper and lower faces thereof and it also has an insulating film 7 provided between the actuator 14 and the stacked body constituted of the contact electrode 5 and the floating electrode 3. The stacked body constituted of the contact electrode 5 and the floating electrode 3 has insulating films 7 on its upper face and side face. The piezoelectric type actuator 14 and the stacked body constituted of the contact electrode 5 and the floating electrode 3 constitute a cantilever beam, and the stacked body constituted of the contact electrode 5 and the floating electrode 3 serves as a movable electrode. The cantilever beam extends in a direction generally orthogonal to a direction in which the first and second electrodes 1 and 2 extend. Incidentally, thickness sizes of the first and second electrodes 1 and 2 are about 500 nm, and the spacing between the first and second electrodes 1 and 2 is about 10 μm.

Next, an operation of the variable-capacitance element according to the embodiment will be explained.

In the embodiment, the piezoelectric type actuator 14 is employed as the actuator. As shown in FIG. 3, the upper electrode 10 and the lower electrode 12 are provided on the upper face and the lower face of the piezoelectric film 11 so that the piezoelectric type actuator 14 can be driven by applying a potential difference between the both electrodes. As the piezoelectric film 11, AlN, PZT, or the like can be used.

Figure 4:
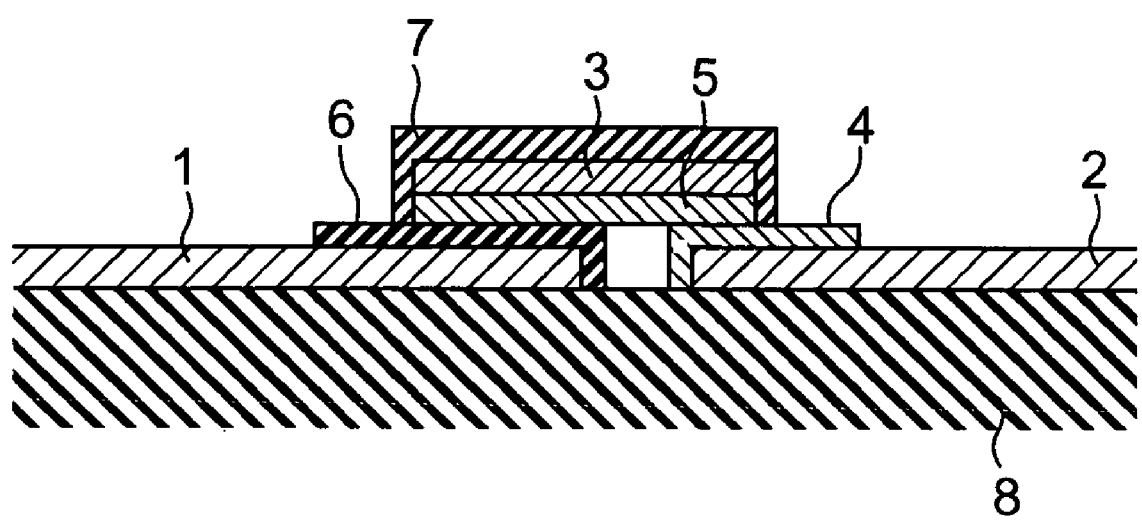
FIG. 4 is a sectional view of the variable-capacitance element according to the first embodiment when an actuator displaces, taken along line A—A shown in FIG. 1.

The floating electrode 3 is put in an electrically floating state, so that it can be moved up and down by driving the actuator 14. A state that the floating electrode 3 is not driven by the piezoelectric type actuator 14 so that displacement thereof does not occur is shown in FIG. 2, while a state that the floating electrode 3 has been driven by the piezoelectric type actuator 14 so that it has been displaced toward the substrate 8 is shown in FIG. 4. In the state that the floating electrode 3 has displaced, the contact electrode 5 electrically connected to the floating electrode 3 comes in contact with the contact electrode 4 so that the contact electrode 5 and the contact electrode 4 are put in an electrically short-circuited state and the contact electrode 5 comes in contact with the insulating film 6. Consequently, the first electrode 1 and the second electrode 2 are connected to each other via a capacitance constituted of the insulating film 6.

On the other hand, in a state where displacement of the floating electrode 3 does not occur, a capacitance formed from the insulating film 6 and a capacitance formed of a space between the insulating film 6 and the contact electrode 5 are put in a serially connected state between the first electrode 1 and the floating electrode 3. A state that a capacitance formed of a space between the contact electrode 4 and the contact electrode 5 has been inserted is formed between the second electrode 2 and the floating electrode 3. Accordingly, in the state that displacement of the floating electrode 3 does not occur, three capacitors in total are connected serially between the first electrode 1 and the second electrode 2 is formed.

In the state that displacement of the floating electrode 3 does not occur, when a distance between the insulating film 6 and the contact electrode 5 is represents as d1, a distance between the contact electrode 4 and the contact electrode 5 is represented as d2, an overlapping area of the first electrode 1 and the floating electrode 3 is represented as S1, an overlapping area between the contact electrode 4 and the floating electrode 3 is represented as S2, a dielectric constant of the insulating film 6 is represented as $\epsilon_r$, and a thickness of the insulating film 6 is represented as t1, the capacitance ratio (=Cmax/Cmin) is expressed as follows:

$$\text{Cmax/Cmin} = 1 + \epsilon_r(d1/t1) + \epsilon_r(d2/t1)(S1/S2) \quad (1)$$

In the conventional variable-capacitance element, its capacitance ratio is determined from the distance between electrodes. As understood from the above equation (1), however, in the variable-capacitance element according to the embodiment, the area ratio S1/S2 of the overlapping areas also influences on the capacitance ratio. Accordingly, even if a displacement amount of the floating electrode 3 is generally equal to that in the conventional variable-capacitance element, the capacitance ratio in the variable-capacitance element according to the embodiment can be made further large by increasing the area ratio S1/S2.

In the state that the floating electrode 3 has displaced, a distance from the second electrode 2 to the insulating film 6 is short so that a low resistance can be achieved. Therefore, a variable-capacitance element with reduced loss resistance and a small Q value can be obtained.

In the embodiment, it is preferable that the first and second electrodes 1 and 2, and the floating electrode 3 are made from metal with low resistance, such as Al. It is preferable that the contact electrodes 4 and 5 are made from metal which does not lose its conductivity even if it exposes to air, such as Au or Pt. The first and second electrodes 1 and 2, and the floating electrode 3 may be formed from metal which does not lose its conductivity even if it exposes to air, if the metal has a low resistance. It is preferable that the insulating film 6 is formed from insulating film material with a large dielectric constant $\epsilon_r$, for example, SiN, AlN, or $Al_2O_3$.

As explained above, according to the embodiment, a variable-capacitance element and a variable-capacitance device having a large capacitance ratio and a large Q value can be obtained.

Figure 23:
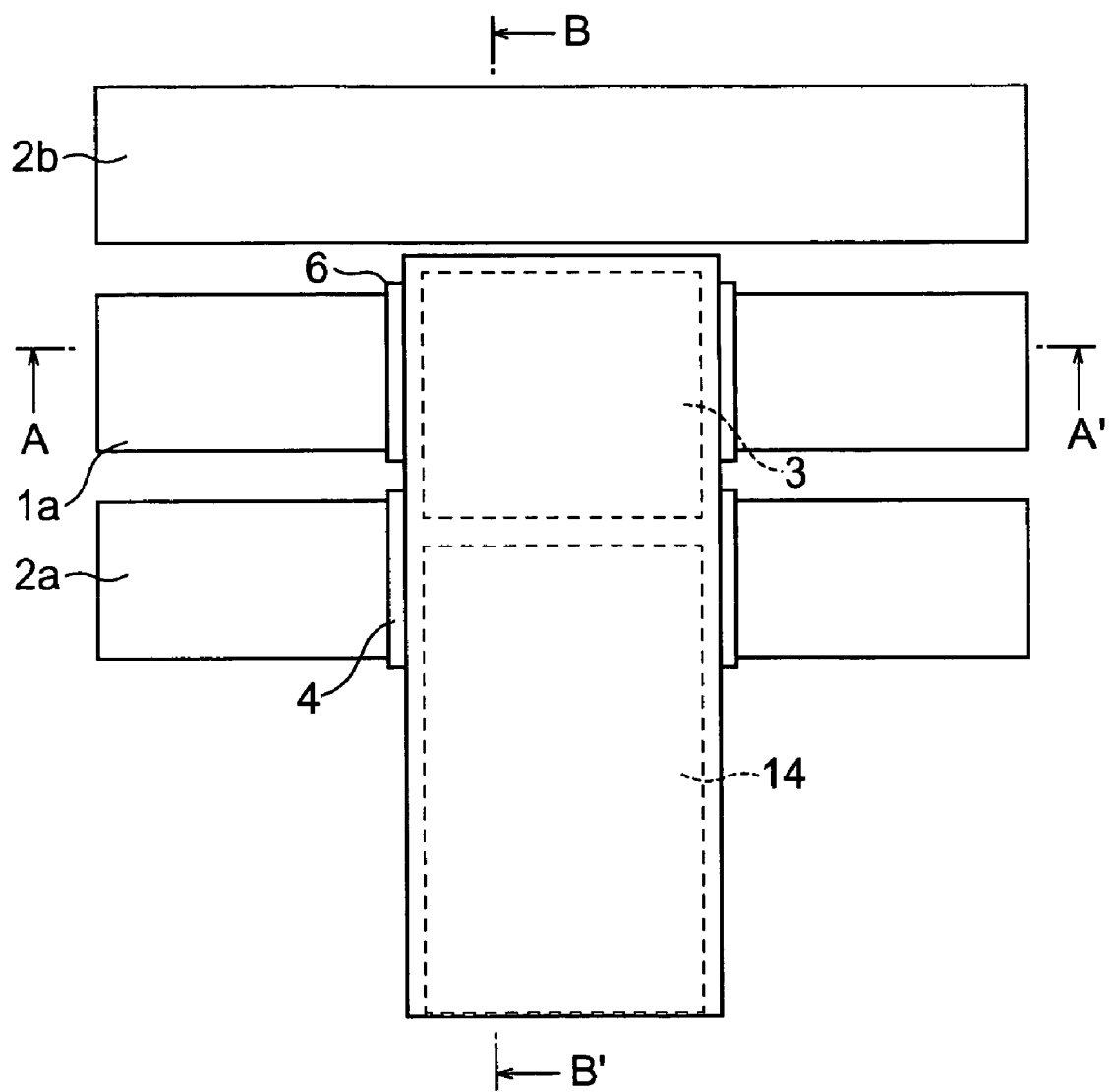
FIG. 23 is an upper view of a variable-capacitance element according to a modification of the first embodiment of the present invention.
Figure 24:
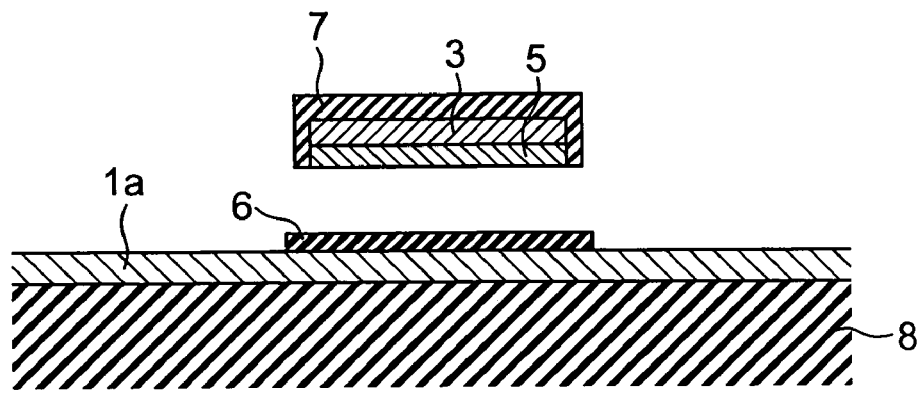
FIG. 24 is a sectional view of the variable-capacitance element according to the modification of the first embodiment, taken along line A—A shown in FIG. 23.
Figure 25:
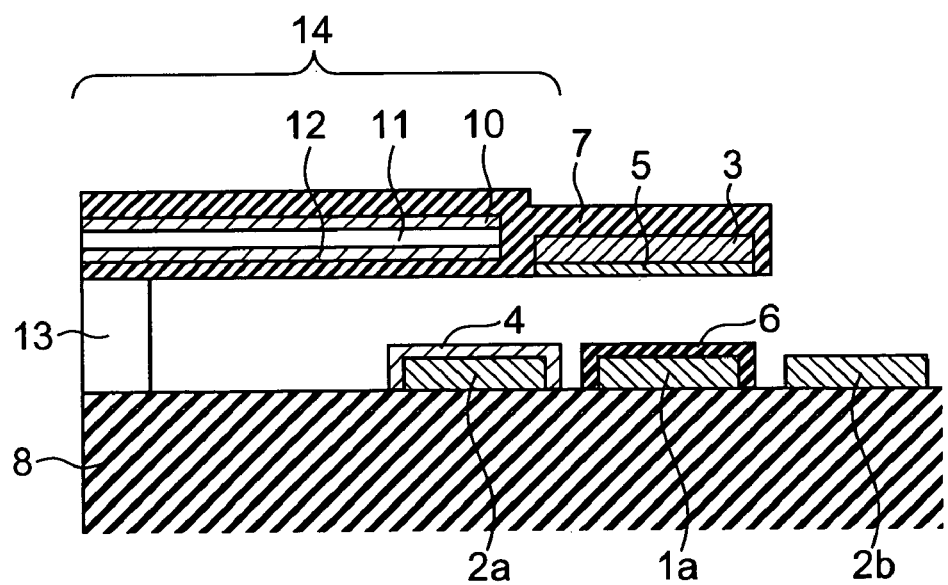
FIG. 25 is a sectional view of the variable-capacitance element according to the modification of the first embodiment, taken along line B—B shown in FIG. 23.

As a structure for the variable-capacitance element, a structure shown as variant in FIGS. 23 to 25 may be adopted. In the variant, a portion corresponding to the first and second electrodes or wires 1 and 2 in the first embodiment is constituted of a co-planar wires constituted of a ground wire 2a, a signal wire 1a, and a ground wire 2b. An operation principle and an advantage of the variable-capacitance element of the variant are similar to those in the first embodiment.

(Second Embodiment)

Figure 5:
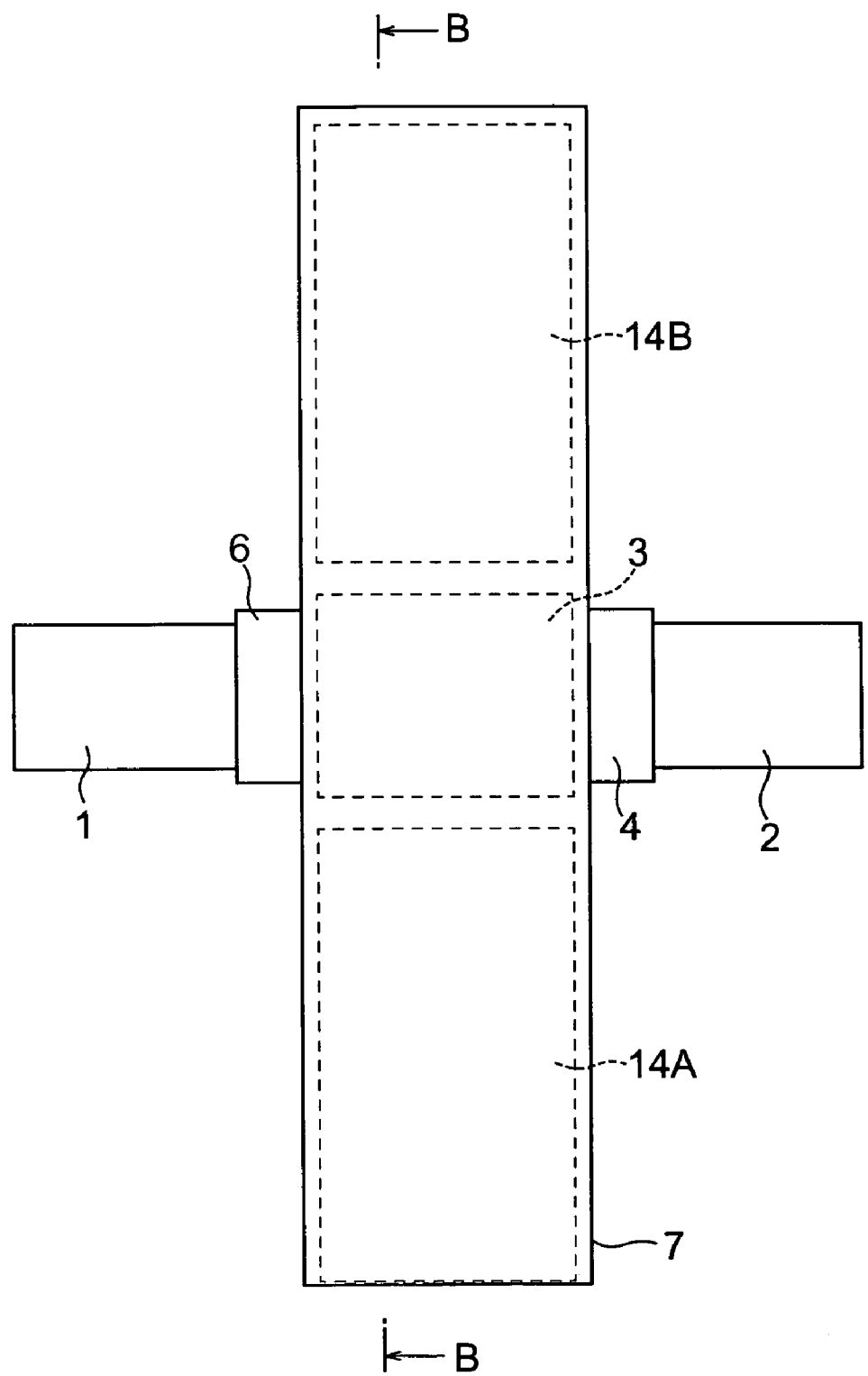
FIG. 5 is an upper view of a variable-capacitance element according to a second embodiment of the present invention.
Figure 6:
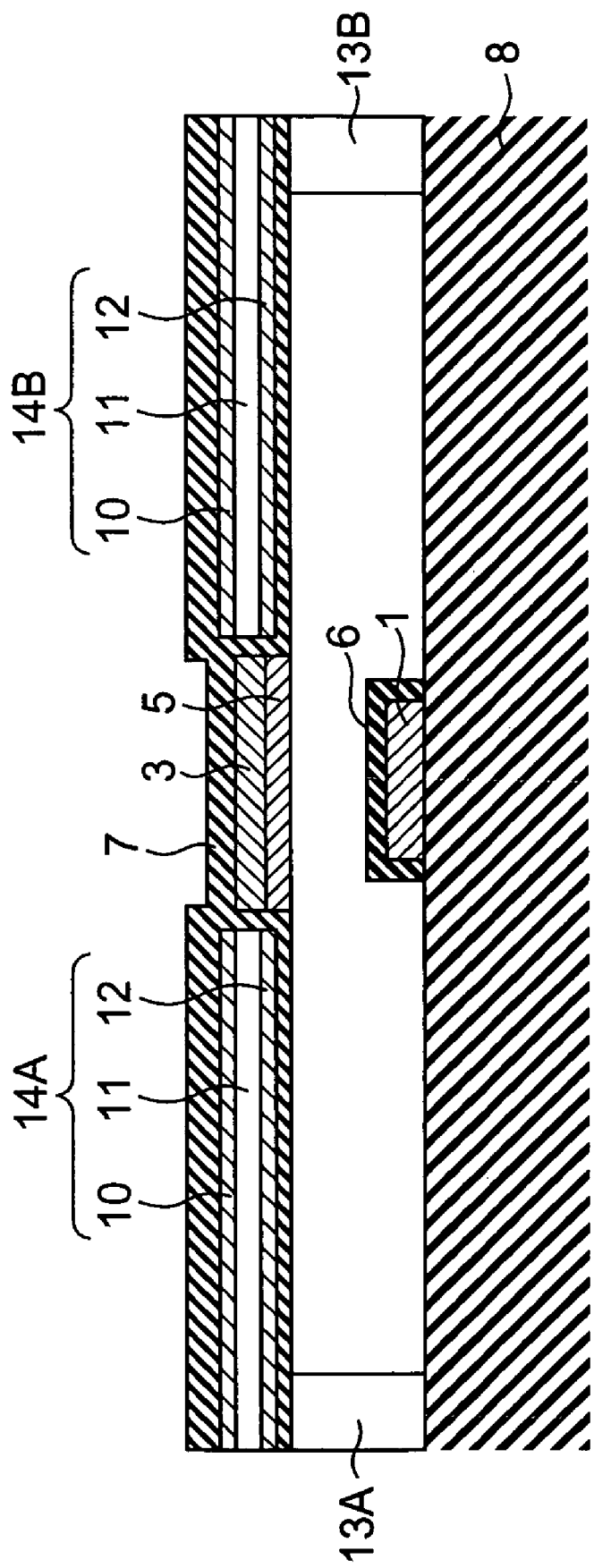
FIG. 6 is a sectional view of the variable-capacitance element according to the second embodiment, taken along line B—B shown in FIG. 5.

Next, a variable-capacitance element according to a second embodiment of the invention will be explained with reference to FIGS. 5 and 6. FIG. 5 is an upper view of a variable-capacitance element of the embodiment, and FIG. 6 is a sectional view of the variable-capacitance element of the embodiment, taken along line B—B shown in FIG. 5. The variable-capacitance element according to the embodiment employs such a constitution that the piezoelectric type actuator 14 constituting the cantilever beam is replaced by piezoelectric type actuators 14A and 14B provided on both sides of the stacked body constituted of the floating electrode 3 and the contact electrode 5 in the variable-capacitance element according to the first embodiment. The piezoelectric type actuator 14A is supported by a supporting portion 13A provided on the substrate 8 and the piezoelectric type actuator 14B is supported by a supporting portion 13B provided on the substrate 8. The piezoelectric type actuators 14A and 14B are each constituted of a stacked body including a piezoelectric film 11, an upper electrode 10 provided on an upper face of the piezoelectric film 11, and a lower electrode 12 provided on a lower face of the piezoelectric film 11. Each of the piezoelectric type actuators 14A and 14B includes insulating films 7 provided on upper and lower faces thereof and also includes an insulating film 7 between itself and the stacked body constituted of the contact electrode 5 and the floating electrode 3. Accordingly, the piezoelectric type actuators 14A and 14B, and the stacked body constituted of the contact electrode 5 and the floating electrode 3 constitutes an inboard beam. That is, the stacked body constituted of the contact electrode 5 and the floating electrode 3 is caused to displace toward the substrate 8 by driving the piezoelectric type actuators 14A and 14B. The stacked body constituted of the contact electrode 5 and the floating electrode 3 is disposed above a spacing 30 between the first and second electrodes 1 and 2 so as to overlap with at least one portions of the contact electrode 4 and the insulating film 6 in a view from the above like the first embodiment.

According to the embodiment, a variable-capacitance element and a variable-capacitance device having a large capacitance ratio and a large Q value can be obtained like the first embodiment.

(Third Embodiment)

Figure 7:
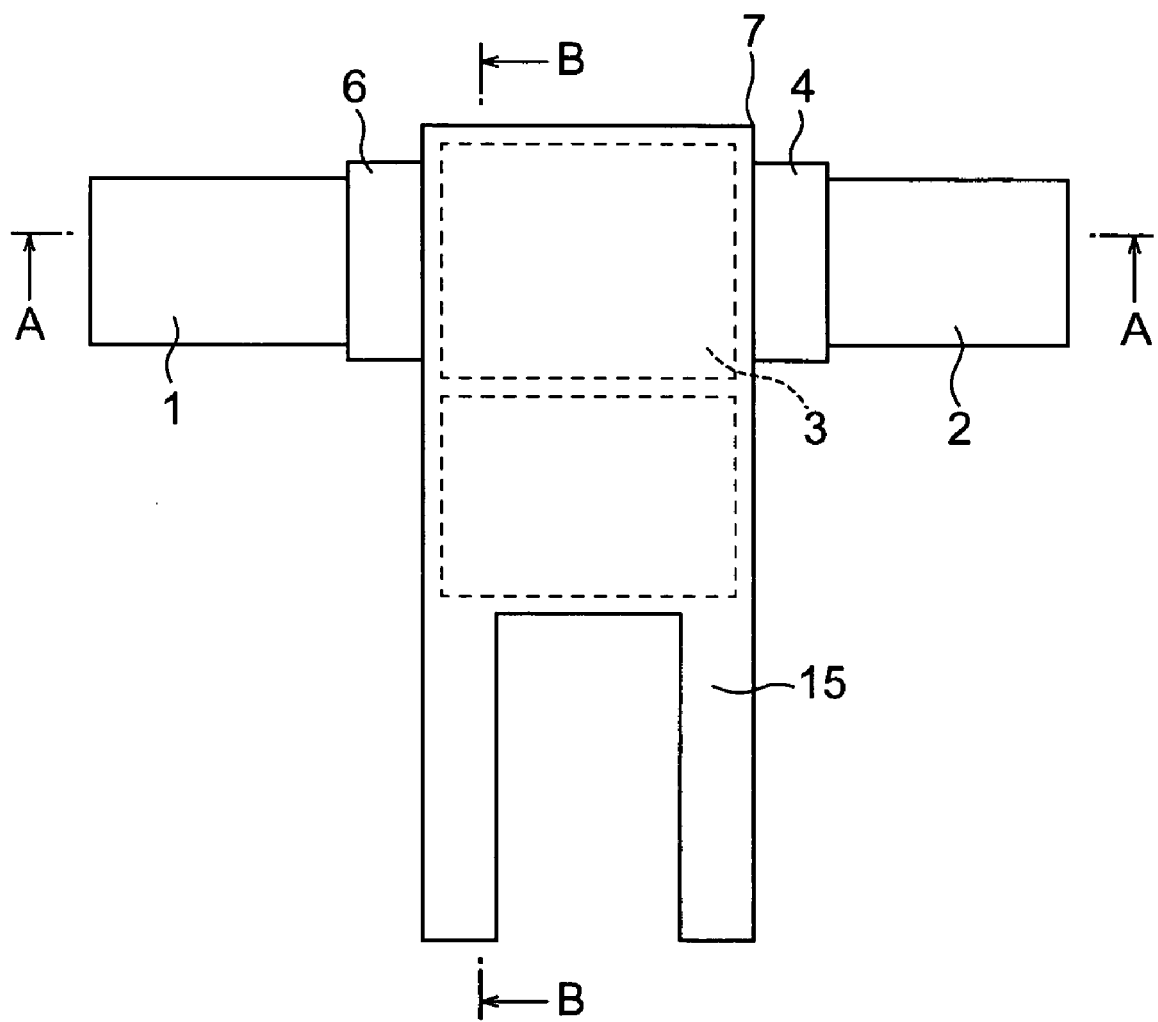
FIG. 7 is an upper view of a variable-capacitance element according to a third embodiment of the present invention.
Figure 8:
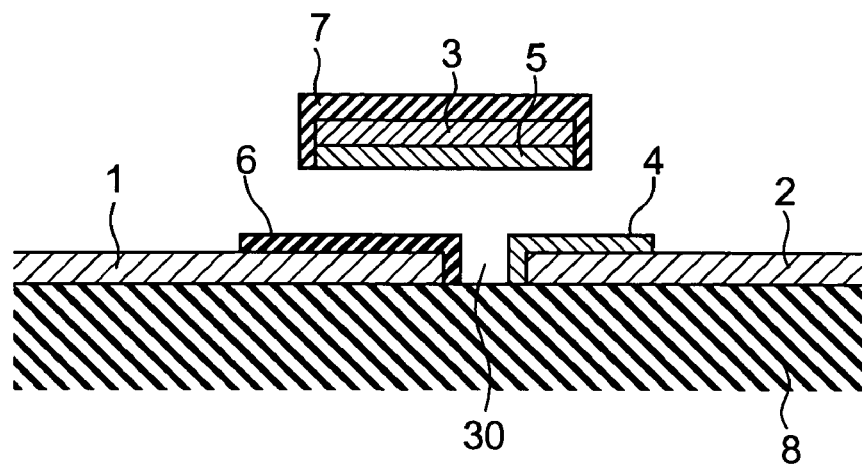
FIG. 8 is a sectional view of the variable-capacitance element according to the third embodiment, taken along line A—A shown in FIG. 7.
Figure 9:
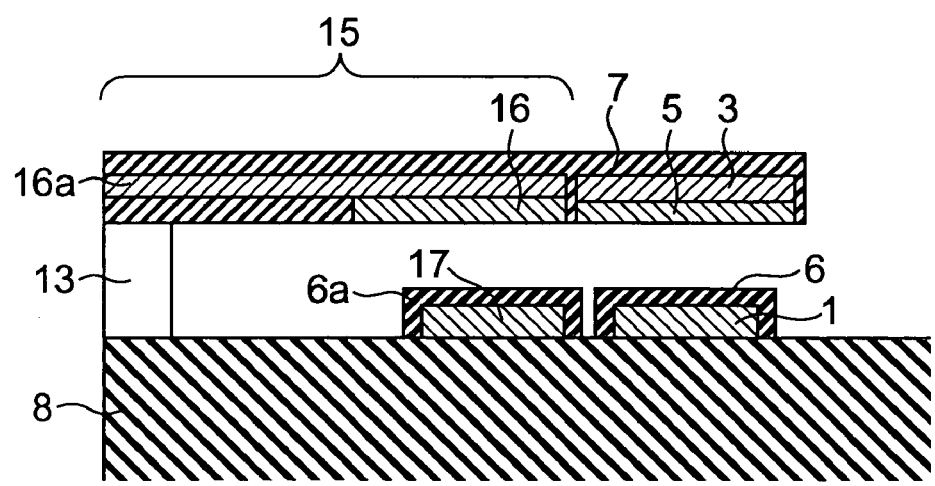
FIG. 9 is a sectional view of the variable-capacitance element according to the third embodiment, taken along line B—B shown in FIG. 7.

Next, a variable-capacitance element according to a third embodiment according to the invention will be explained with reference to FIGS. 7 to 9. FIG. 7 is an upper view of a variable-capacitance element according to the embodiment, FIG. 8 is a sectional view of the variable-capacitance element according to the embodiment, taken along line A—A shown in FIG. 7, and FIG. 9 is a sectional view of the variable-capacitance element according to the embodiment, taken along line B—B shown in FIG. 7.

The variable-capacitance element according to the embodiment is constituted such that the piezoelectric type actuator 14 is replaced by a static type actuator 15 in the variable-capacitance element according to the first embodiment. The static type actuator 15 is provided with driving electrodes 16 and 17 and a leading electrode 16a.

The driving electrode 17 is provided on the substrate 8, and the leading electrode 16a is provided on the driving electrode 16 to be electrically connected to the driving electrode 16. The static type actuator 15 is provided on an upper face and a lower face thereof with insulating films 7 and is further provided with an insulating film 7 disposed between itself and the stacked body constituted of the contact electrode 5 and the floating electrode 3.

An end of the static type actuator 15 positioned on an opposite side from the stacked body constituted of the contact electrode 5 and the floating electrode 3 is supported by a supporting portion 13 provided on the substrate 8. Accordingly, the static type actuator 15, and the stacked body constituted of the contact electrode 5 and the floating electrode 3 constitute a cantilever beam. In the static type actuator 15, a connecting portion thereof with the stacked body constituted of the contact electrode 5 and the floating electrode 3 of the static type actuator 15 is caused to displaces toward the substrate 8 by applying a potential difference of 20V or more between the driving electrodes 16 and 17, so that the contact electrode 5 is brought in contact with the contact electrode 4 and the insulating film 6. At that time, when the potential difference between the driving electrodes 16 and 17 is made 0V, the connecting portion of the static type actuator 15 with the stacked body constituted of the contact electrode 5 and the floating electrode 3 displaces so as to return back to its home position (a horizontal position) due to a spring force inherent to the beam. That is, the stacked body constituted of the contact electrode 5 and the floating electrode 3 is caused to displace toward the substrate 8 by driving the static type actuator 15. Incidentally, the stacked body constituted of the contact electrode 5 and the floating electrode 3 is disposed above a spacing 30 between the first and second electrodes 1 and 2 so as to overlap with at least one portions of the contact electrode 4 and the insulating film 6 in a view from the above like the first embodiment.

According to the embodiment, a variable-capacitance element and a variable-capacitance device having a large capacitance ratio and a large Q value can be obtained like the first embodiment.

Though the actuator in the embodiment is of the static type, it may be of a thermal type or an electromagnetic type. Such a constitution may be adopted that an actuator of a static type, a thermal type, or an electromagnetic type is applied to an inboard beam structure like the second embodiment.

Figure 10:
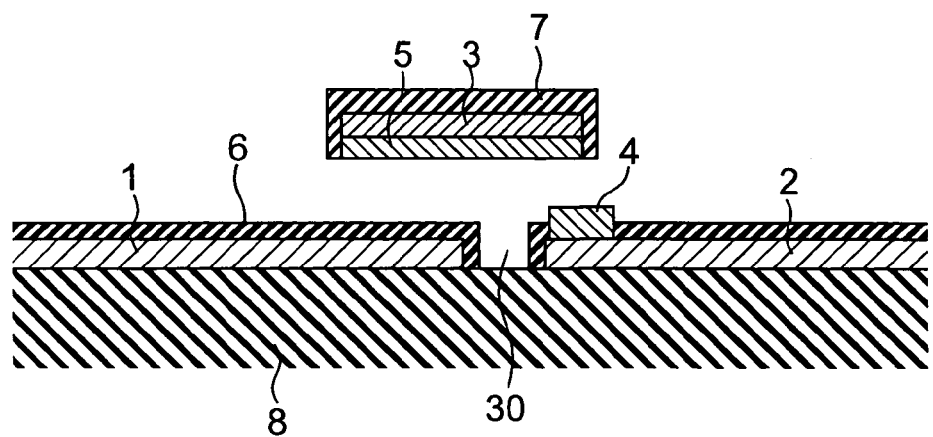
FIG. 10 is a sectional view of the variable-capacitance element according a modification of any one of the first to third embodiments.

In the first to third embodiments, a processing on the insulating film 6 or the contact electrode 4 is performed using a lithographic process or a lift-off process. As shown in FIG. 10, such a constitution may be adopted that the insulating film 6 covers upper faces of the first and second electrodes 1 and 2. In that case, the contact electrode 4 is formed to have a film thickness thicker than that of the insulating film 6. Accordingly, such a structure is employed that, when the stacked body constituted of the contact electrode 5 and the floating electrode 3 displaces toward the substrate 8, the contact electrode 5 does not come in contact with the insulating film 6 coming in contact with the contact electrode 4

In the first to third embodiments, such a structure is adopted that the contact electrode 5 and the insulating film 6 come in direct contact with each other. It is known that, when large electric field is applied in such an MEMS variable-capacitance element in a state that the insulating film 6 and the electrode 5 are put in a contacting state, charges are trapped in the insulating film 6, a problem about a reliability such as change in capacitance value or shifting in a pull-out voltage occurs. The problem can be avoided by adopting the variant shown in FIG. 10. Another example which allows avoidance of the problem will be explained as a fourth embodiment.

(Fourth Embodiment)

Figure 11:
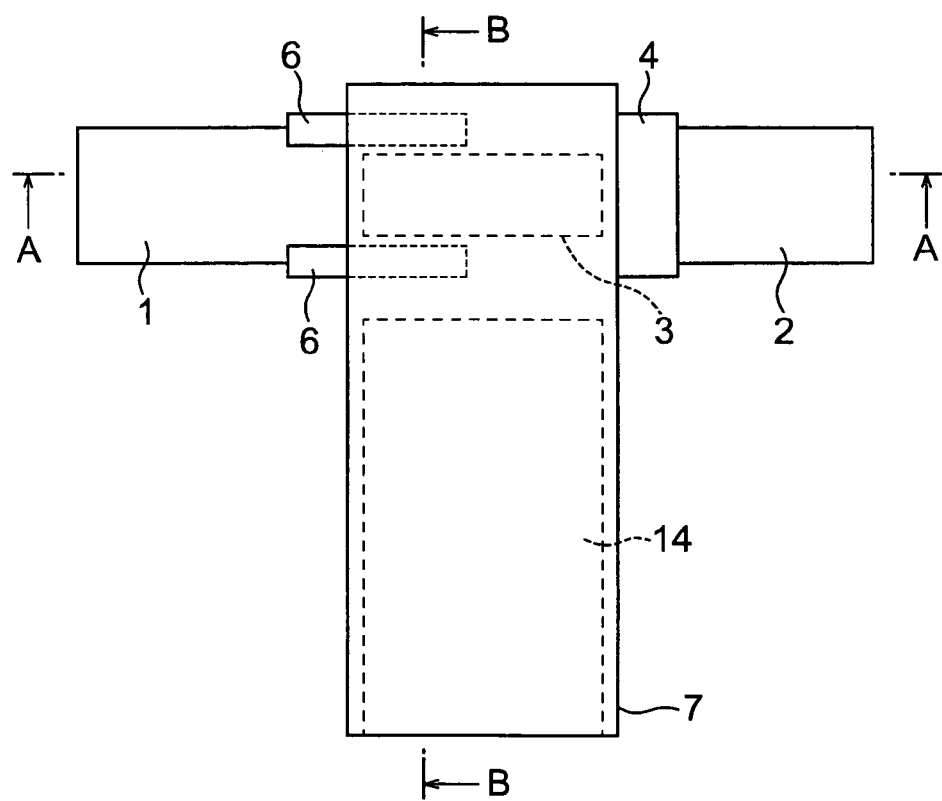
FIG. 11 is an upper view of a variable-capacitance element according to a fourth embodiment of the present invention.
Figure 12:
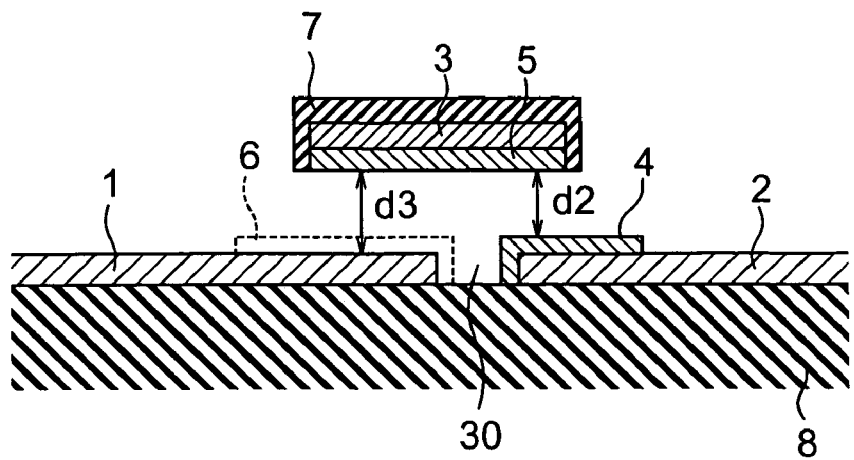
FIG. 12 is a sectional view of the variable-capacitance element according to the fourth embodiment, taken along line A—A shown in FIG. 11.
Figure 13:
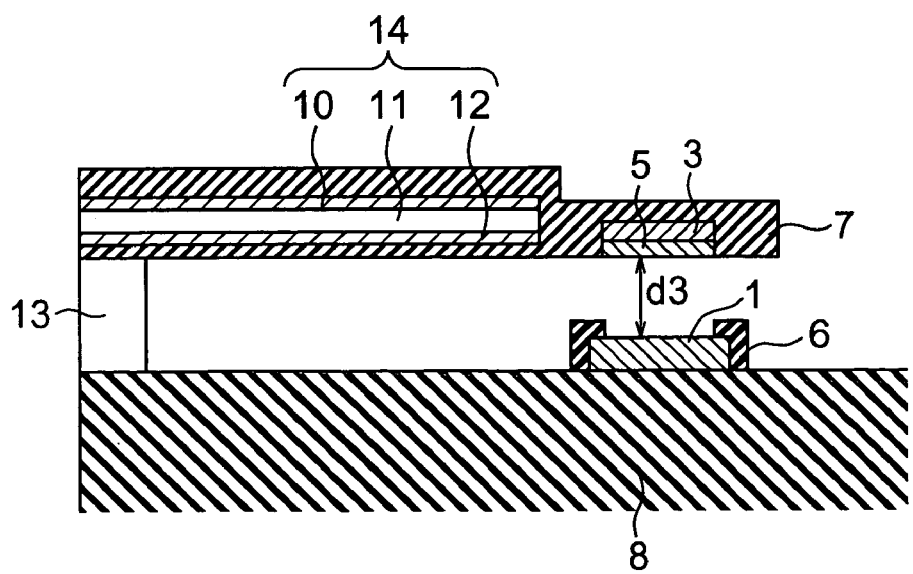
FIG. 13 is a sectional view of the variable-capacitance element according to the fourth embodiment, taken along line B—B shown in FIG. 11.

Next, a variable-capacitance element according to a fourth embodiment of the invention will be explained with reference to FIGS. 11 to 13. FIG. 11 is an upper view of a variable-capacitance element according the embodiment, FIG. 12 is a sectional view of the variable-capacitance element according the embodiment, taken along line A—A shown in FIG. 11, and FIG. 13 is a sectional view of the variable-capacitance element according the embodiment, taken along line B—B shown in FIG. 11.

The variable-capacitance element according to the embodiment has such a constitution that a width of the stacked body constituted of the contact electrode 5 and the floating electrode 3 in a direction orthogonal to a direction in which the first and second electrodes 1 and 2 extend is set to be narrower than a width of the electrode 1 such that, when the stacked body constituted of the contact electrode 5 and the floating electrode 3 is driven by the piezoelectric type actuator 14 to be displaced toward the substrate 8, the contact electrode 5 does not come in contact with the insulating film 6, and the insulating film 6 is provided on the first electrode 1 so as not to overlap with the stacked body constituted of the contact electrode 5 and the floating electrode 3 in an upper view in the first embodiment. Incidentally, such a constitution is employed that, when the stacked body constituted of the contact electrode 5 and the floating electrode 3 displaces toward the substrate 8, the contact electrode 5 comes in contact with a contact electrode provided on the second electrode 2.

In the embodiment, when the floating electrode 3 displaces toward the substrate 8 so that contact electrode 5 comes in contact with the contact electrode 4, a clearance is formed between the contact electrode 5 and the first electrode 1. A capacitance formed by the clearance is Cmax. When a height of the clearance is represented as d3, the capacitance ratio is expressed by the following equation (2).

$$C\mathrm{max}/C\mathrm{min} = 1 + (d3/t1) + \epsilon_r (d2/t1)(S1/S2) \qquad (2)$$

Here, d2 represents a distance between the contact electrode 4 and the contact electrode 5, S1 represents an overlapping area of the first electrode 1 and the floating electrode 3, S2 represents an overlapping area of the contact electrode 4 and the floating electrode 3, $\epsilon_r$ represents a dielectric constant of the insulating film 6, and t1 represents a thickness of the insulating film 6. Since the dielectric constant of a portion corresponding to the clearance is 1, the capacitance ratio in this embodiment is slightly reduced as compared with that in the first embodiment. However, since the insulating film 6 does not come in direct contact with the floating electrode 3, the problem about the reliability described above can be avoided.

The insulating film 6 in the embodiment serves to so as to secure the clearance, and it does not contribute to the capacitance value. As shown in FIG. 10, therefore, when there is not any overlap between the floating electrode 3 and the insulating film 6, the insulating film 6 may be replaced by a conductive film in the same manner as the contact electrode 4.

In the first to fourth embodiments, such a constitution may be employed that the contact electrode 4 is formed from the same material as that for the second electrode 2, and the contact electrode 4 and the second electrode 2 are united. In that case, a film thickness of the second electrode 2 is different from that of the first electrode 1.

(Fifth Embodiment)

Figure 14:
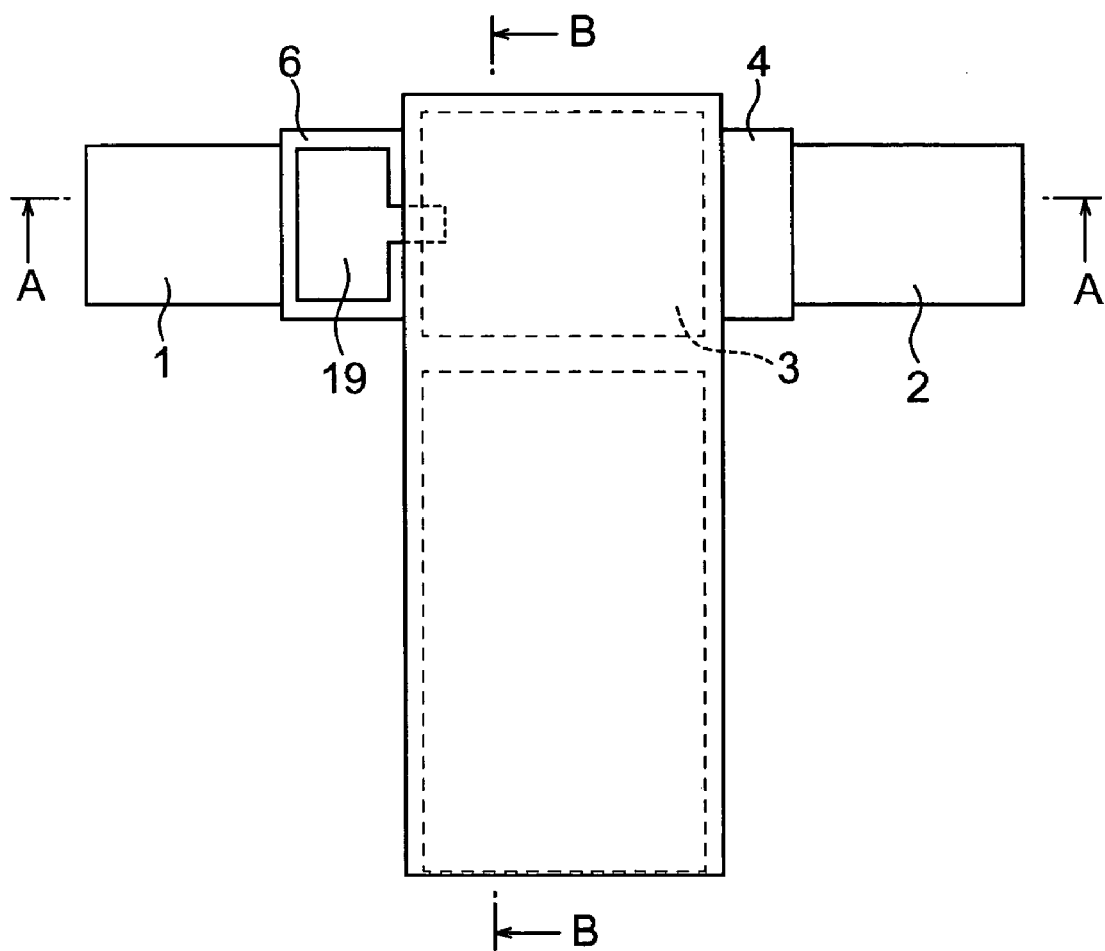
FIG. 14 is an upper view of a variable-capacitance element according to a fifth embodiment of the present invention.
Figure 15:
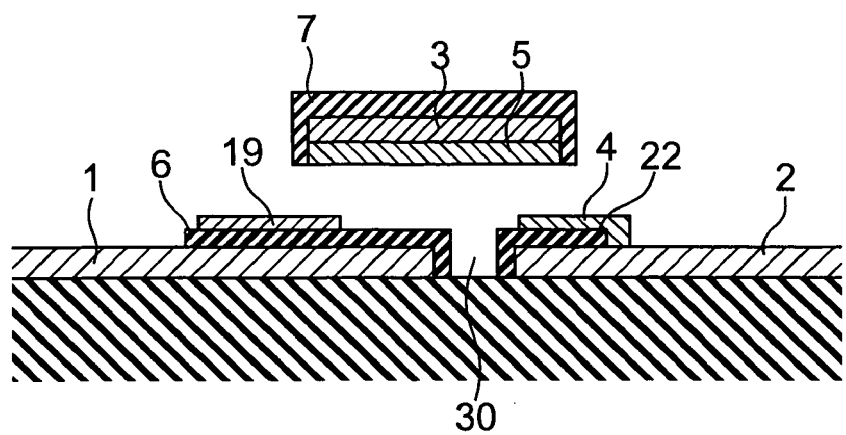
FIG. 15 is a sectional view of the variable-capacitance element according to the fifth embodiment, taken along line A—A shown in FIG. 14.
Figure 16:
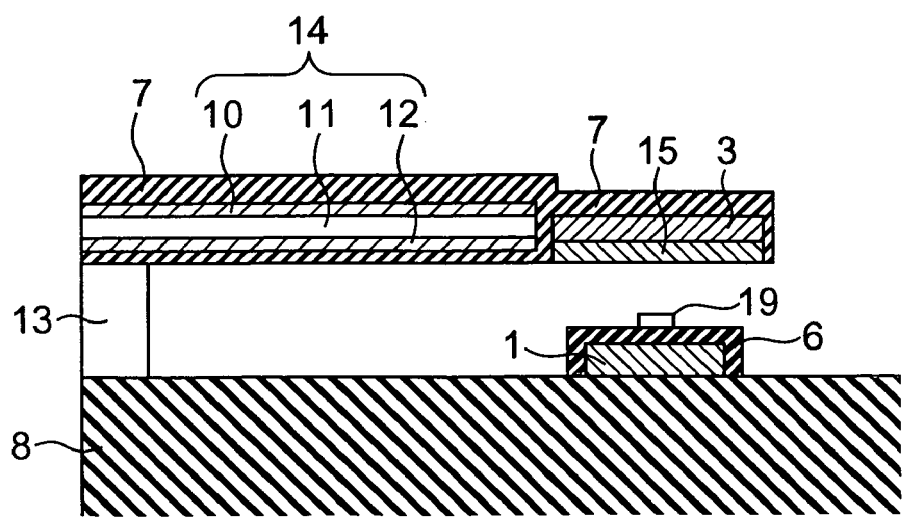
FIG. 16 is a sectional view of the variable-capacitance element according to the fifth embodiment, taken along line B—B shown in FIG. 14.

Next, a variable-capacitance element according to a fifth embodiment of the invention will be explained with reference to FIGS. 14 to 16. FIG. 14 is an upper view of a variable-capacitance element according to the embodiment, FIG. 15 is a sectional view of the variable-capacitance element according to the embodiment, taken along line A—A shown in FIG. 14, and FIG. 16 is a sectional view of the variable-capacitance element according to the embodiment, taken along line B—B shown in FIG. 14.

A variable-capacitance element according to the embodiment is constituted such that a floating electrode 19 is provided on the insulating film 6, and an intermediate layer 22 made from insulating material is provided between the contact electrode 4 and the second electrode 2 in the first embodiment. As shown in FIG. 15, the second electrode 2 and the contact electrode 4 are electrically connected to each other. An overlapping area $S_T$ of the floating electrodes 3 and 19 is set to be smaller than an overlapping area $S_B$ of the floating electrode 19 and the insulating film 6. When the floating electrode 3 is caused to displace toward the substrate 8 by the actuator 14, the floating electrode 19 and the contact electrode 4 are short-circuited via the contact electrode 5. In that state, therefore, the first and second electrodes 1 and 2 are put in a state connected to each other via the capacitance formed by the insulating film 6. Incidentally, the intermediate layer 22 may be made from conductive material, for example, the same material as that for the second electrode instead of the insulating material.

When a distance between the contact electrode 5 and the floating electrode 19 is represented as d1, a distance between the contact electrode 5 and the contact electrode 4 is represented as d2, an overlapping area of the floating electrode 3 and the contact electrode 4 is represented as S2, a dielectric constant of the insulating film 6 is represented as $\epsilon_r$, and a thickness of the insulating film 6 is represented as t1 in a state that the floating electrode 3 has been raised (in a state that the floating electrode 3 is not driven by the actuator 14), a capacitance ratio is expressed by the following equation (3).

$$Cmax/Cmin=1+\epsilon_r(S_B/S_T)(d1/t1)+\epsilon_r(d2/t1)(S_B/S2)$$

The capacitance ratio in this embodiment is further increased by an amount corresponding to $(S_B/S_T)$ as compared with that obtained in the first embodiment. Such a structure for a variable-capacitance element that an electrode corresponding to the floating electrode 19 is provided and the capacitance ratio is increased by an amount corresponding to $(S_B/S_T)$ has been known (see X. Rottenberg, et al, "Novel RF-MEMS capacitive switching structures", EUMC2002, 24–26 Sep. 2002, Milan, for example).

The capacitance ratio of the variable-capacitance element according to the embodiment is larger than that of the variable-capacitance element described in the above paper by an amount corresponding to $(S_B/S2)$ which is a gain obtained by the floating electrode 3. Since an upper electrode is formed in a bridge shape in the variable-capacitance element described in the paper, a resistance of a wire extending to reach the upper electrode is large, so that the Q value can not be made sufficiently large. On the other hand, in the embodiment, since a distance from the second electrode 2 to the insulating film 6 is short in a lowered state of the floating electrode 3 so that a low resistance can be attained, a variable-capacitance element with a large Q value can be obtained.

As explained above, according to the embodiment, a variable-capacitance element with a larger capacitance ratio and a higher Q value than those of the variable-capacitance element according to the first embodiment.

In each of the fourth and fifth embodiments, the actuator of the piezoelectric type has been used, but an actuator to be used may be an actuator of a static type, a thermal type, or an electromagnetic type.

In each of the fourth and fifth embodiments, the stacked body constituted of the contact electrode 5 and the floating electrode 3, and the actuator constitute the cantilever beam, but they may constitute an inboard beam like the second embodiment.

A digital variable-capacitance device can be constituted by connecting a plurality of variable-capacitance elements according to any of the first to fifth embodiments in parallel. The digital variable-capacitance device can be used in an antenna matching circuit for a portable phone which allows audio-visual reception of terrestrial digital broadcasting. A system where a portable phone is equipped with a digital variable-capacitance device will be explained below referring to the following embodiment.

(Sixth Embodiment)

Figure 17:
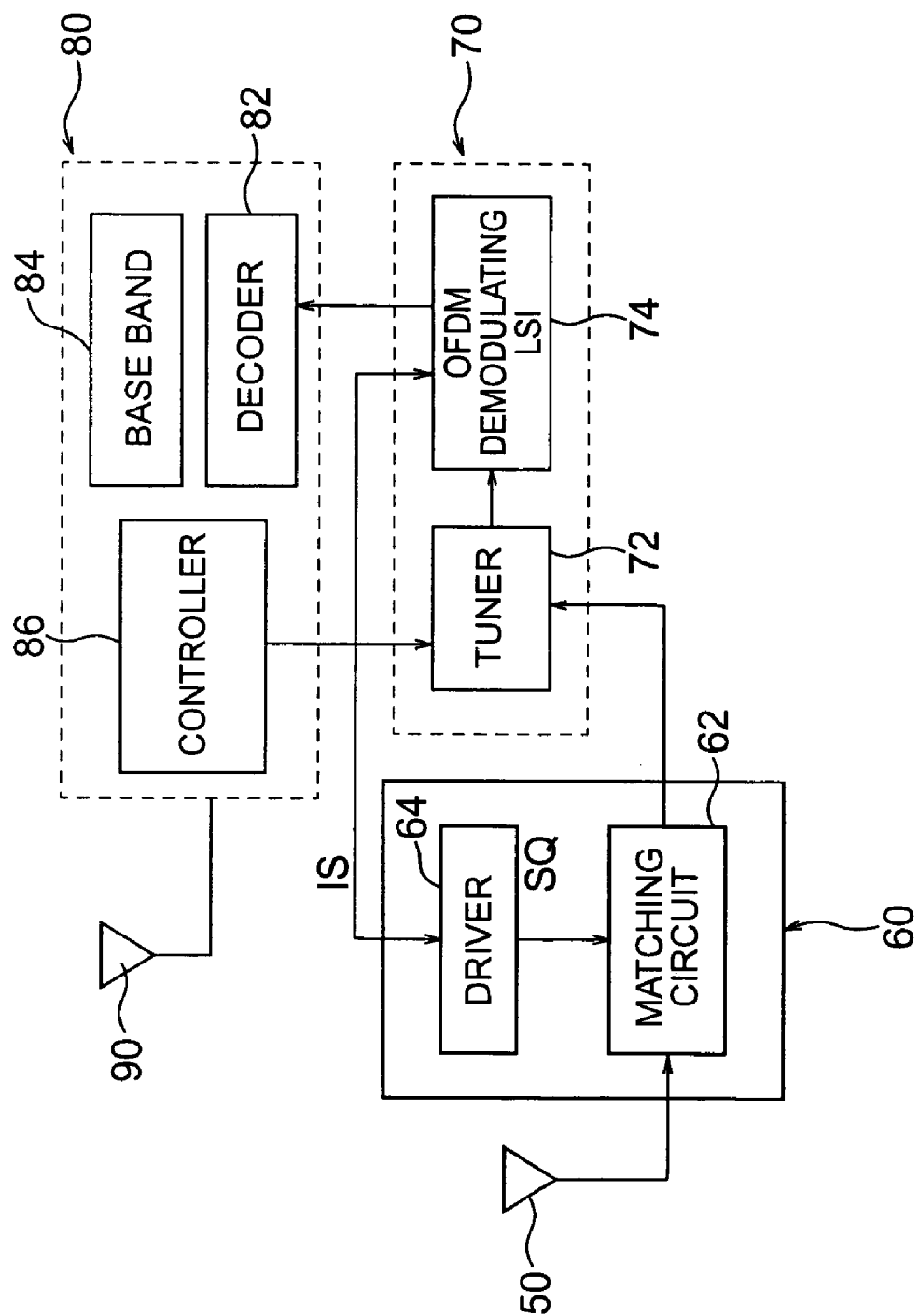
FIG. 17 is a block diagram showing a portable phone according to a sixth embodiment of the invention.

A portable phone according to a sixth embodiment of the invention will be explained with reference to FIGS. 17 to 20. A portable phone according to the embodiment is provided with an audio-visual reception function for a terrestrial digital broadcasting. FIG. 17 is a block diagram of the portable phone according to the embodiment.

The portable phone according to the embodiment is provided with reception antennas 50 and 90, a matching circuit device 60, a front-end device 70, and a back-end device 80. The back-end device 80 is provided with a decoder 82, a base band 84, and a controller 86, and it is provided in a conventional portable phone. An antenna 50 exclusive to terrestrial digital broadcasting reception, a matching circuit device 60, and the front-end device 70 including a tuner 72 and an OFDM (Orthogonal Frequency Division Multiplexing) modulating LSI 74 are devices newly added for terrestrial digital broadcasting reception.

The matching circuit device 60 is provided with a matching circuit 62 and a driver 64 and it also serves to prevent narrow-banding due to mismatching loss of the antenna 50. This point will be explained in further detail below.

The terrestrial digital broadcasting is performed using wave in UHF band corresponding to a frequency range of 470 MHz to 770 MHz (a wavelength of 63 cm to 39 cm). Since the wavelength of the wave is long, when the terrestrial digital broadcasting is received by a dipole antenna, the antenna must have an antenna length of about 15 cm. However, since a design performance especially counts in a recent portable phone, it is desirable that a length of an antenna is reduced as much as possible. More preferably, an antenna is housed inside a casing of a portable phone.

However, since a band is reduced according to small-sizing of an antenna, all of frequencies of 470 MHz to 770 MHz can not be received. In order to avoid the problem, such a constitution may be employed that a matching circuit is provided such that a matching frequency can be changed corresponding to a program that a user wishes to watch. A matching frequency can be changed by constituting the matching circuit, for example, using the variable-capacitance device to change a capacitance value in the variable-capacitance device.

Another problem due to the small-sizing of an antenna lies in lowering of an antenna efficiency. The antenna efficiency is determined depending on a radiation resistance of an antenna itself and a loss resistance from the antenna to a receiving circuit, and it can be expressed by the following equation.

Antenna Efficiency=Radiation Resistance/(Radiation Resistance+Loss Resistance)

Since the radiation resistance is made small according to reduction in size of an antenna, the antenna efficiency lowers unless the loss resistance becomes small. For example, when a PIN diode is employed as the variable capacitance for the matching circuit, since a loss resistance thereof is large, the antenna efficiency lowers. On the other hand, MEMS has a low loss resistance and a loss resistance thereof can be suppressed to 1Ω or less. Accordingly, when a MEMS variable capacitance is employed in the matching circuit, an antenna reduced in size can be realized. Such an antenna can be housed in a casing of a portable phone.

In the embodiment, as shown in FIG. 17, the matching circuit device 60 is provided with the driver 64 and the matching circuit 62. The matching circuit 62 is constituted of a variable-capacitance device. Channel selecting information IS outputted from the controller 86 is inputted into the driver 64, and after it is converted to a capacitance value selecting signal SQ, the signal SQ is inputted into the matching circuit 62.

Figure 18:
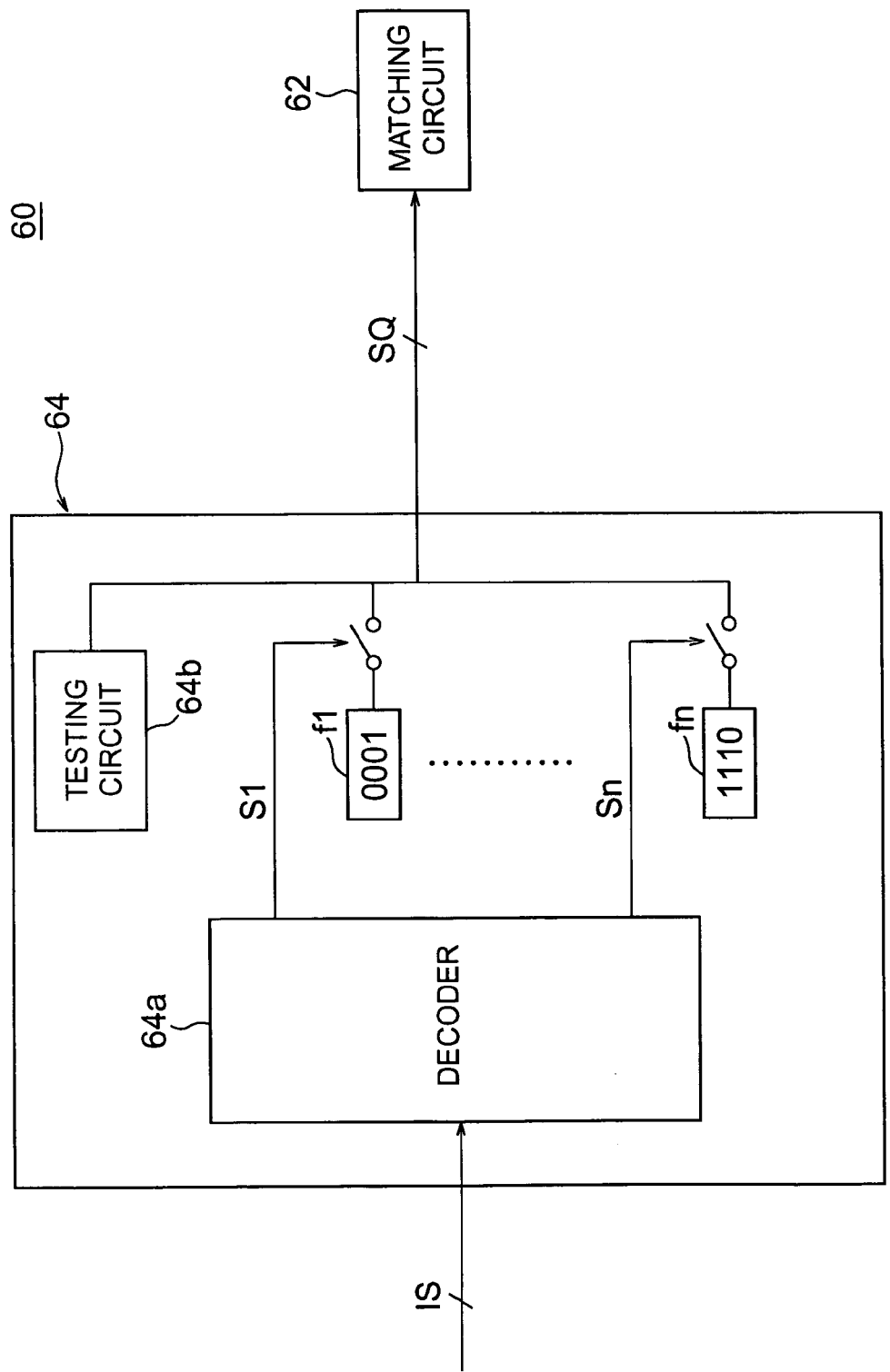
FIG. 18 is a block diagram showing one specific example of a matching circuit device according to the sixth embodiment.

A first specific example of the driver 64 is shown in FIG. 18. Channel selecting information IS is inputted into the driver 64, for example, via an I²C bus in a binary signal form. The binary signal is decoded by a decoder 64$a$ in the driver 64. Decoded signals S1, . . . , Sn shown in FIG. 18 are decoded signals. When the decoded signal Si (i=1, . . . , n) is activated (the signal becomes "High" of "High"/"Low", for example), the i-th fuse data fi is outputted as the capacitance value selecting signal SQ to be inputted into the matching circuit 62. Thus, the capacitance value in the matching circuit 62 varies according to the channel selecting information IS, so that matching state of the antenna 50 to a frequency band of a broadcasting station channel-selected can be achieved.

The reason why the fuse data is used as the capacitance value selecting signal SQ is for correcting fluctuation of a capacitance value in the MEMS variable-capacitance element and influence of a parasitic capacitance in the matching circuit 62. The fuse data is determined in a testing step in the following manner. First, the capacitance value selecting signal SQ is outputted from the testing circuit 64$b$ shown in FIG. 18 and the capacitance value of the matching circuit 62 is changed one step by one step from the minimum value to the maximum value. The capacitance value of the matching circuit 62 during such an operation is monitored by a tester. Next, fuse data in the driver 64 is determined according to the monitored value such that a capacitance value corresponding to the channel-selecting information IS can be realized. Determination about the fuse data may be made, for example, according to laser blow.

Figure 19:
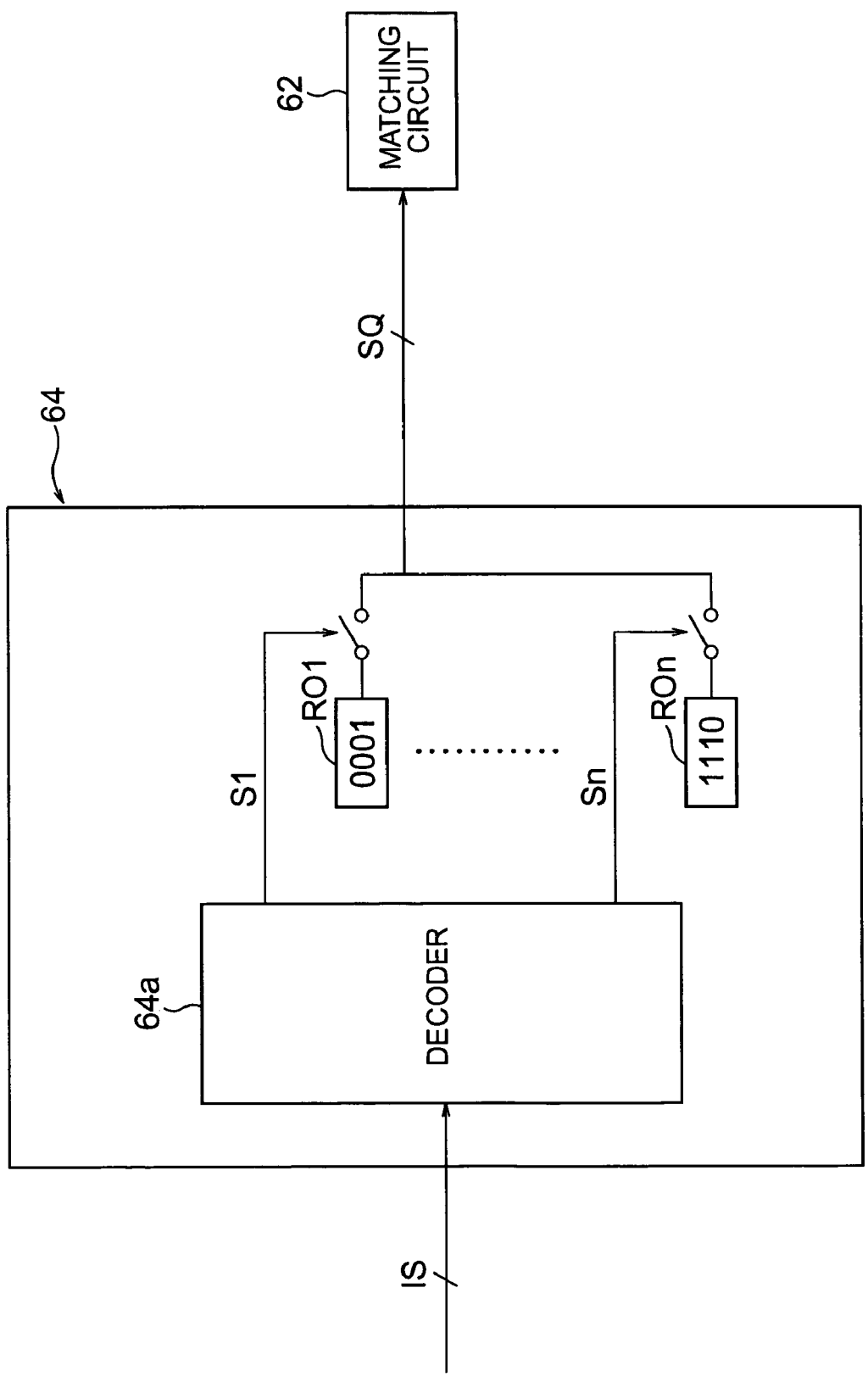
FIG. 19 is a block diagram of another specific example of the matching circuit device according to the sixth embodiment.

When fluctuation of the capacitance value in the variable-correction element and the parasitic influence of the matching circuit 62 are sufficiently small so that correction is not required, such a constitution may be employed that the test circuit is removed and the fuses are replaced by non-volatile memories, for example, read-only memories (ROMs) RO1 to ROn, as shown in FIG. 19.

Figure 20:
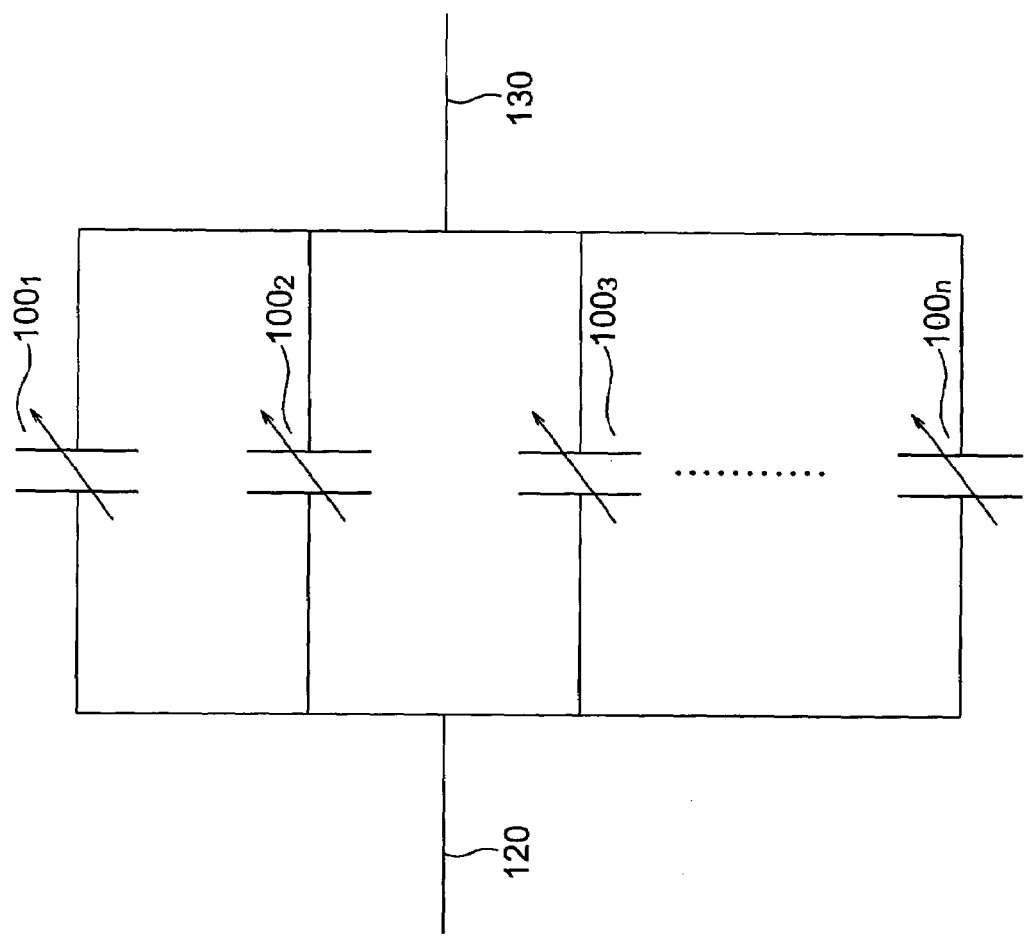
FIG. 20 is a block diagram showing one specific example of a matching circuit according to the sixth embodiment.
Figure 21:
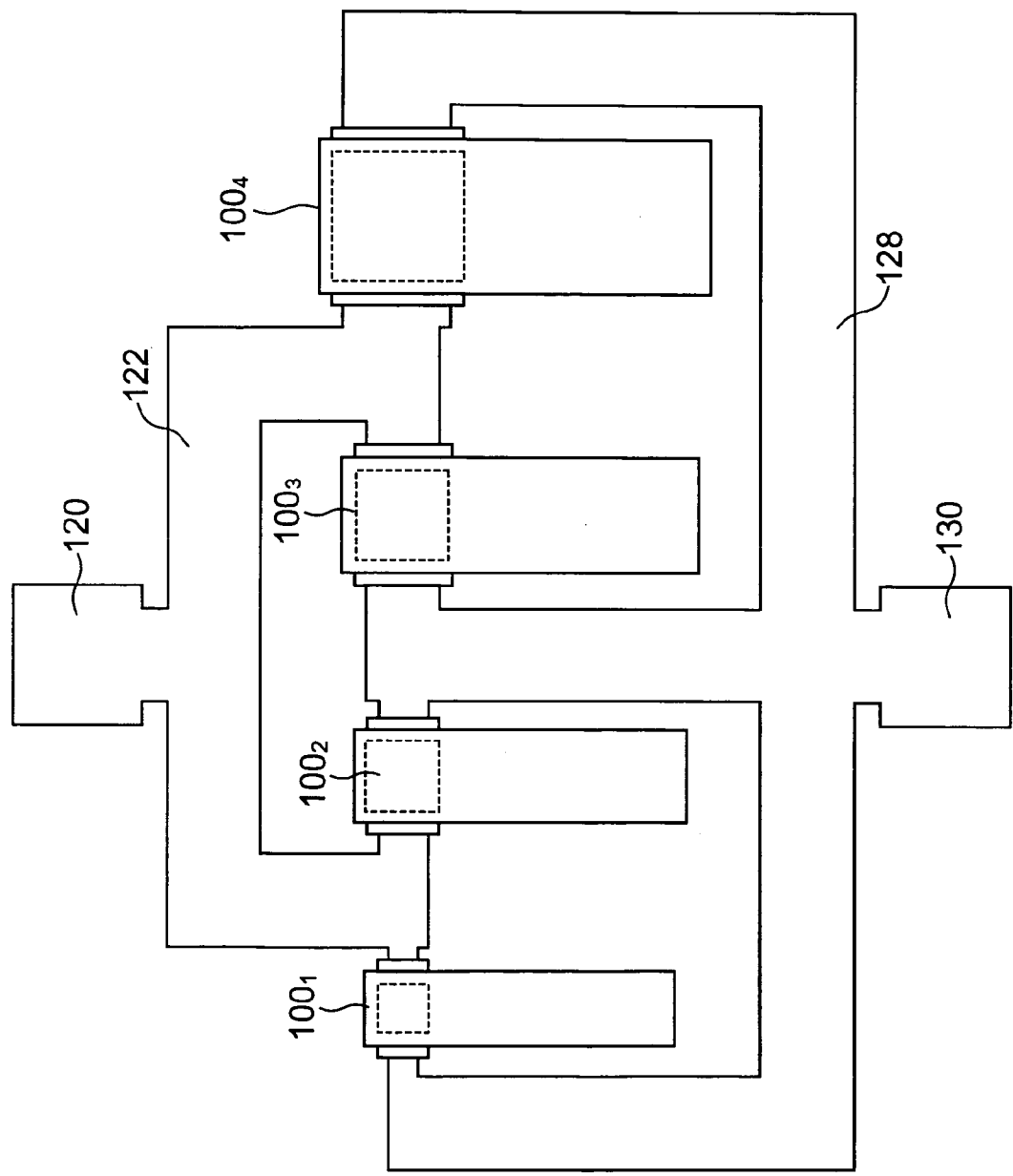
FIG. 21 is a diagram showing one specific example of a layout of a matching circuit according to the sixth embodiment.

The variable-capacitance device in the matching circuit 62 is constituted as shown in FIG. 20. Variable-capacitance elements $100_1$, . . . , $100_m$ are MEMS variable-capacitance elements whose capacitance values can be digitally changed by an actuator (in a binary manner). A port 120 is connected to an antenna and a port 130 is connected to the ground. A layout for the matching circuit 62, for example, shown in FIG. 21 may be employed. Each of the variable-capacitance elements $100j$ (j=1, 2, 3, 4) is a digital variable-capacitance element that can realize a capacitance value of $2^{j-1}C$ or 0, and it is any variable-capacitance element according to the first to fifth embodiments. One of first and second electrodes of the variable-capacitance element $100_1$, one of first and second electrodes of the variable-capacitance element $100_2$, one of first and second electrodes of the variable-capacitance element $100_3$, and one of first and second electrodes of the variable-capacitance element $100_4$ are connected to the port 120 via a wiring portion 122. The other of the first and second electrodes of the variable-capacitance element $100_1$, the other of the first and second electrodes of the variable-capacitance element $100_2$, the other of the first and second electrodes of the variable-capacitance element $100_3$, and the other of the first and second electrodes of the variable-capacitance element $100_4$ are connected to the port 130 via a wiring portion 128. Thus, by allocating the capacitance values in a binary manner, the capacitance value can be changed to 16 values by using four digital variable-capacitance elements. The number of the digital variable-capacitance elements is not limited to four.

Figure 22:
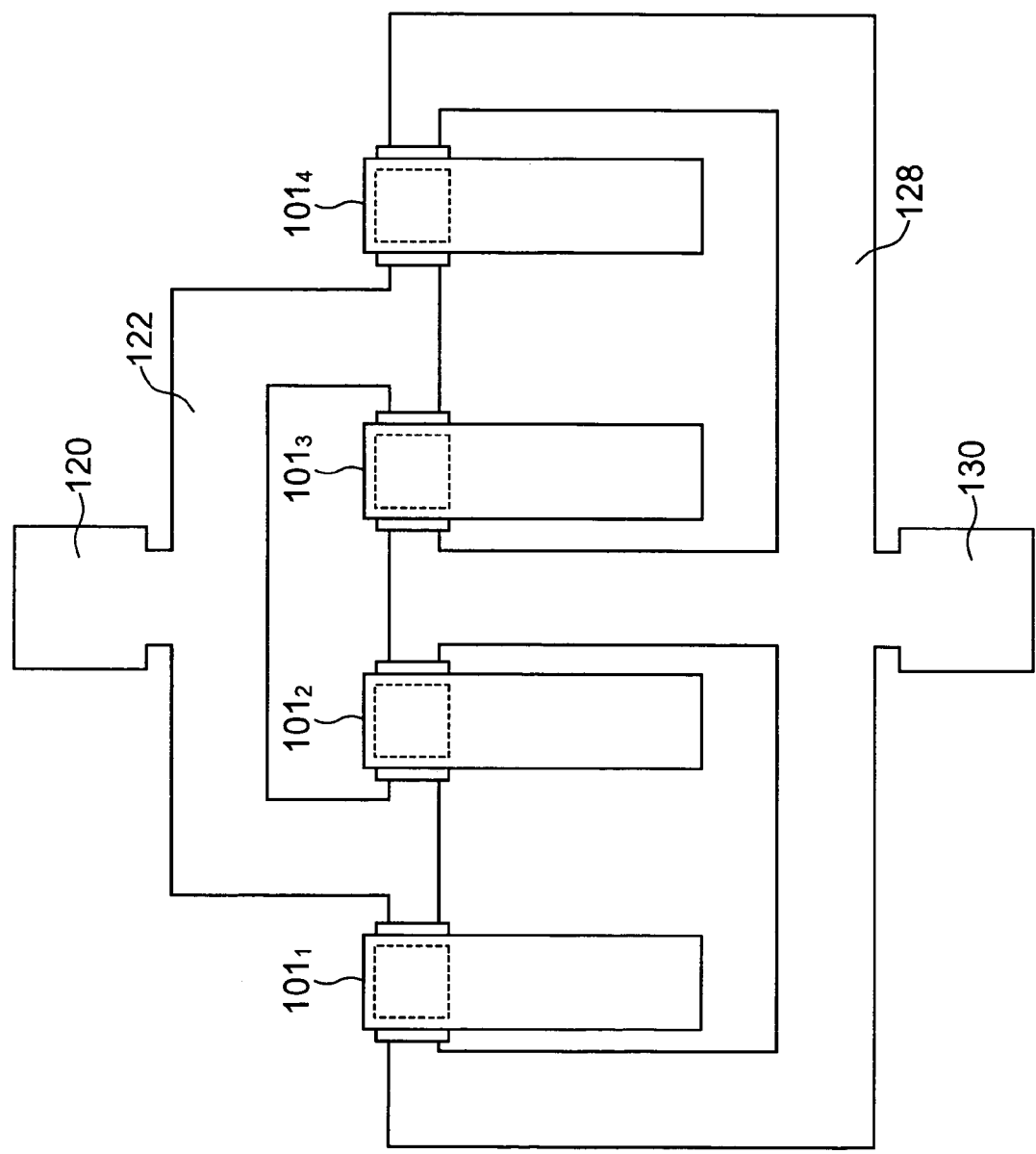
FIG. 22 is a diagram showing another specific example of a layout of the matching circuit according to the sixth embodiment.

Such a constitution may be employed in the variable-capacitance device for the matching circuit 62 that digital variable-capacitance elements $101_1$ to $101_4$ having the same capacitance value to be realized are arranged in parallel, as shown in FIG. 22. In FIG. 22, one of first and second electrodes of the variable-capacitance element $101_1$, one of first and second electrodes of the variable-capacitance element $101_2$, one of first and second electrodes of the variable-capacitance element $101_3$, and one of first and second electrodes of the variable-capacitance element $101_4$ are connected to the port 120 via the wiring portion 122. The other of the first and second electrodes of the variable-capacitance element $101_1$, the other of the first and second electrodes of the variable-capacitance element $101_2$, the other of the first and second electrodes of the variable-capacitance element $101_3$, and the other of the first and second electrodes of the variable-capacitance element $101_4$ are connected to the port 130 via the wiring portion 128.

The variable-capacitance device having any of the variable-capacitance elements according to the first to fifth embodiment can be used in a circuit other than the antenna matching circuit, for example, VCO.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A variable-capacitance element, comprising:
a first electrode and a second electrode which are fixed on a substrate with a spacing;
a movable electrode; and
an actuator which is supported on a supporting portion provided on the substrate to drive the movable electrode, wherein:
the movable electrode is put in an electrically connecting state with the second electrode, when the movable electrode is driven to a first position by the actuator, and the movable electrode is put in a electrically non-connected state with the second electrode, when the movable electrode is driven to a second position by the actuator,
the movable electrode is constituted to be always put in an electrically non-connected state with the first electrode, and
a surface of the first electrode is covered with an insulating film.

2. The variable-capacitance element according to claim 1, wherein, a first contact electrode which comes in contact with the movable electrode when the movable electrode is driven to the first position by the actuator is provided on the second electrode.

3. The variable-capacitance element according to claim 2, wherein, when the movable electrode is driven to the first position by the actuator to be brought in contact with the second electrode, the movable electrode overlaps with one portions of the insulating film and the first contact electrode.

4. The variable-capacitance element according to claim 1, wherein the actuator and the movable electrode constitutes a cantilever beam supported by the supporting portion.

5. The variable-capacitance element according to claim 1, wherein the supporting portion has first and second supporting portions, the actuator includes a first actuator whose one end is supported by the first supporting portion and a second actuator whose one end is supported by the second supporting portion, and the other ends of the first and second actuators are connected to the movable electrode to drive the movable electrode.

6. The variable-capacitance element according to claim 1, wherein a floating electrode which is brought in electrical contact with the movable electrode only when the movable electrode is driven to the first position by the actuator to come in contact with the second electrode is provided on the insulating film.

7. The variable-capacitance element according to claim 6, wherein an overlapping area of the floating electrode and the movable electrode is smaller than an overlapping area of the floating electrode and the insulating film.

8. The variable-capacitance element according to claim 1, wherein the actuator is a piezoelectric type actuator provided with a piezoelectric film and a driving electrode for driving the piezoelectric film.

9. The variable-capacitance element according to claim 1, wherein the actuator is a static type actuator provided with a first driving electrode provided on the substrate and a second driving electrode connected to the movable electrode via an insulating film.

10. The variable-capacitance element according to claim 1, wherein a film thickness of the first electrode is thinner than a film thickness of the second electrode.

11. A variable-capacitance device comprising a plurality of variable-capacitance elements according to claim 1 connected in parallel.

12. The variable-capacitance device according to claim 11, wherein respective capacitance values of the variable-capacitance elements are different from one another.

13. The variable-capacitance device according to claim 11, wherein respective capacitance values of the variable-capacitance elements are the same value.

14. The variable-capacitance device according to claim 11, wherein in each of the variable-capacitance elements, a surface of the first electrode is covered with an insulating film.

15. The variable-capacitance device according to claim 14, wherein in each of the variable-capacitance elements, a first contact electrode which comes in contact with the movable electrode when the movable electrode is driven to the first position by the actuator is provided on the second electrode.

16. The variable-capacitance device according to claim 15, wherein in each of the variable-capacitance elements, when the movable electrode is driven to the first position by the actuator to be brought in contact with the second electrode, the movable electrode overlaps with one portions of the insulating film and the first contact electrode.

17. The variable-capacitance device according to claim 14, wherein in each of the variable-capacitance elements, a floating electrode which is brought in electrical contact with the movable electrode only when the movable electrode is driven to the first position by the actuator to be brought in contact with the second electrode is provided on the insulating film.

18. The variable-capacitance device according to claim 11, wherein in each of the variable-capacitance elements, a film thickness of the first electrode is thinner than a film thickness of the second electrode.

19. A portable phone comprising a matching circuit having a variable-capacitance device according to claim 11.

20. The variable-capacitance element according to claim 1, wherein the movable electrode has a stacked body of a contact electrode and a floating electrode, wherein a width of the stacked body in a direction orthogonal to a direction in which the first and second electrodes extend is narrower than a width of the first electrode such that, when the stacked body is driven to the first position by the actuator, the contact electrode does not come in contact with the insulating film, and wherein the insulating film is provided on the first electrode so as not to overlap with the stacked body as viewed from above.

* * * * *